United States Patent
Mateo Rodriguez et al.

(10) Patent No.: US 12,401,503 B2
(45) Date of Patent: Aug. 26, 2025

(54) HYBRID QUANTUM CRYPTOGRAPHY PROTOCOL FOR OPTICAL COMMUNICATIONS

(71) Applicant: NEC Laboratories America, Inc., Princeton, NJ (US)

(72) Inventors: Eduardo Fabian Mateo Rodriguez, Tokyo (JP); Yoshihisa Inada, Tokyo (JP)

(73) Assignee: NEC Corporation, Tokyo (JP)

( * ) Notice: Subject to any disclaimer, the term of this patent is extended or adjusted under 35 U.S.C. 154(b) by 173 days.

(21) Appl. No.: 18/367,496

(22) Filed: Sep. 13, 2023

(65) Prior Publication Data

US 2024/0089094 A1   Mar. 14, 2024

Related U.S. Application Data

(60) Provisional application No. 63/406,713, filed on Sep. 14, 2022.

(51) Int. Cl.
H04L 9/08    (2006.01)
H04B 10/70   (2013.01)

(52) U.S. Cl.
CPC .......... H04L 9/0852 (2013.01); H04B 10/70 (2013.01)

(58) Field of Classification Search
CPC .................................................. H40L 9/0852
See application file for complete search history.

(56) References Cited

U.S. PATENT DOCUMENTS

| | | | |
|---|---|---|---|
| 2004/0156407 A1* | 8/2004 | Beausoleil ............. | B82Y 10/00 372/17 |
| 2004/0200952 A1* | 10/2004 | Beausoleil, Jr. ....... | B82Y 10/00 250/225 |
| 2007/0183593 A1* | 8/2007 | Yoshida ................ | H04L 9/0662 380/28 |
| 2014/0205302 A1* | 7/2014 | Chen .................. | H04B 10/5561 398/188 |
| 2020/0084033 A1* | 3/2020 | Lamas-Linares ........................... | H04B 10/6151 |
| 2020/0274701 A1* | 8/2020 | Yuan ..................... | H04L 9/0841 |
| 2022/0303130 A1* | 9/2022 | Qi ........................ | H04L 9/0852 |
| 2024/0089094 A1* | 3/2024 | Mateo Rodriguez .. | H04B 10/70 |

* cited by examiner

*Primary Examiner* — Dao Q Ho
(74) *Attorney, Agent, or Firm* — Joseph Kolodka

(57) ABSTRACT

A hybrid Quantum Key Distribution (QKD) protocol and method for secure transmission in optical communications systems and in particular long distance optical communications systems such as those in undersea environments. Our inventive method advantageously exploits fundamental security features of quantum-base encryption with the added intrinsic security of encapsulated and sealed equipment of undersea optical networks. Our method employs an intermediate node that generates an optical signal, and a pair of quantum state generators that respectively generate quantum states of the optical signal and transmit the generated quantum states to secure nodes, respectively. The secure nodes then communicate securely using a quantum key distribution (QKD) protocol.

7 Claims, 5 Drawing Sheets

HYBRID QUANTUM CRYPTOGRAPHY PROTOCOL FOR OPTICAL COMMUNICATIONS

CROSS-REFERENCE TO RELATED APPLICATIONS

This application claims the benefit of U.S. Provisional Patent Application Ser. No. 63/406,713 filed Sep. 14, 2022, the entire contents of which is incorporated by reference as if set forth at length herein.

FIELD OF THE INVENTION

This application relates generally to secure communications in fiber-optic networks. More particularly, it pertains to a hybrid quantum cryptography protocol for optical communications.

BACKGROUND OF THE INVENTION

Quantum Key Distribution (QKD) is a protocol that exploits the laws of quantum mechanics to ensure secure communications. QKD is protocol that is agreed to by two communicating parties (Alice and Bob) in which the two communicating parties share a secret key and exchange encrypted information in a secure manner. Operationally, the QKD protocol requires the generation, transmission, and detection of quantum states. The shared secret key must be encoded in such a way that quantum properties are revealed during decoding. This can be accomplished, for example, by encoding the secret key in the polarization state of a single photon.

The probabilistic and statistical nature of quantum mechanics prevents a third party, (Eve), from intercepting messages between Alice and Bob without altering the statistics of Alice's and/or Bob's measurements. In other words, the fundamental laws of quantum physics ensures that the security of the channel cannot be compromised regardless of the computation resources available to an eavesdropper.

As those skilled in the art will readily understand and appreciate, in optical networks, optical amplifiers are employed to compensate for power losses due to fiber attenuation. As such, optical amplifiers are essential to enable efficient optical data transmission over long distances. Optical amplifiers also add noise to transmitted optical signals in the form of amplified spontaneous emission. This noise randomly modifies quantum states and may prevent the use of QKD protocols. In the case of optical networks, this limitation imposes a transmission distance limit of several hundreds of kilometers. Beyond these distances, optical amplifiers are required and QKD is not possible.

In undersea optical networks, transmission distances are transoceanic, i.e. several thousands of kilometers, and such transoceanic optical networks require many amplifiers. Since a large percentage of transcontinental data is transmitted via submarine networks, systems, methods, and structures that facilitate the use of QKD-based security methodologies on such optical submarine networks would represent a welcome addition to the art.

To resolve the limitation of transmission distance in terrestrial QKD networks, the prior art in U.S. Pat. No. 11,196,550 to Yuan et al., entitled Secure Communications Network, has proposed the use of intermediate nodes that are sometimes called "trusted nodes".

An intermediate node or "trusted node" regenerates a quantum state sent by an originating node to extend transmission distance. The trusted node performs a quantum-to-classical-to-quantum (QCQ) conversion to recover a secret key and regenerate the quantum state for retransmission to a destination node. In this QCQ process, since there are processes that occur in the "classical world" an eavesdropper can apply classical techniques to obtain the key. Therefore, to ensure that the QCQ process happens in a secure environment a third party such as a telecommunications carrier must guarantee that an eavesdropper cannot access the equipment performing the QCQ conversion.

SUMMARY OF THE INVENTION

The above problems are solved and an advance in the art is made according to aspects of the present disclosure directed to a hybrid QKD protocol for secure transmission in optical communications systems and in particular long distance optical communications systems such as those in undersea environments. Our inventive method advantageously exploits fundamental security features of quantum-base encryption with the added intrinsic security of encapsulated and sealed equipment of undersea optical networks.

In sharp contrast to the prior art, systems, and methods according to the present disclosure provide nodal exchange of a secret key protected by the quantum laws of physics—without key regeneration in a trusted node while exploiting an inherent physical protection of submerged, undersea equipment.

Operationally, we disclose a hybrid quantum cryptography protocol method for secure communications between Secure Node A (SN-A) and Secure Node B (SN-B) over a fiber optic communications network, the method comprising: emitting, by an intermediate node (IN) into a point of the fiber optic communications network in-between SN-A and SN-B, optical signals with four levels exhibiting five different values distributed randomly in time; generating, by a pair of quantum state generators, QSG-A, and QSG-B in response to receiving the optical signals with four levels, a respective quantum state QS-A, and QS-B, conveying the generated quantum states QS-A, and QS-B, to SN-A, and SN-B respectively; measuring, by SN-A and SN-B, the respective quantum states QS-A, and QS-B conveyed; and establishing, using the measured quantum states, a quantum key distribution (QKD) protocol between SN-A and SN-B.

BRIEF DESCRIPTION OF THE DRAWING

A more complete understanding of the present disclosure may be realized by reference to the accompanying drawing in which.

DETAILED DESCRIPTION OF THE INVENTION

Figure 1:
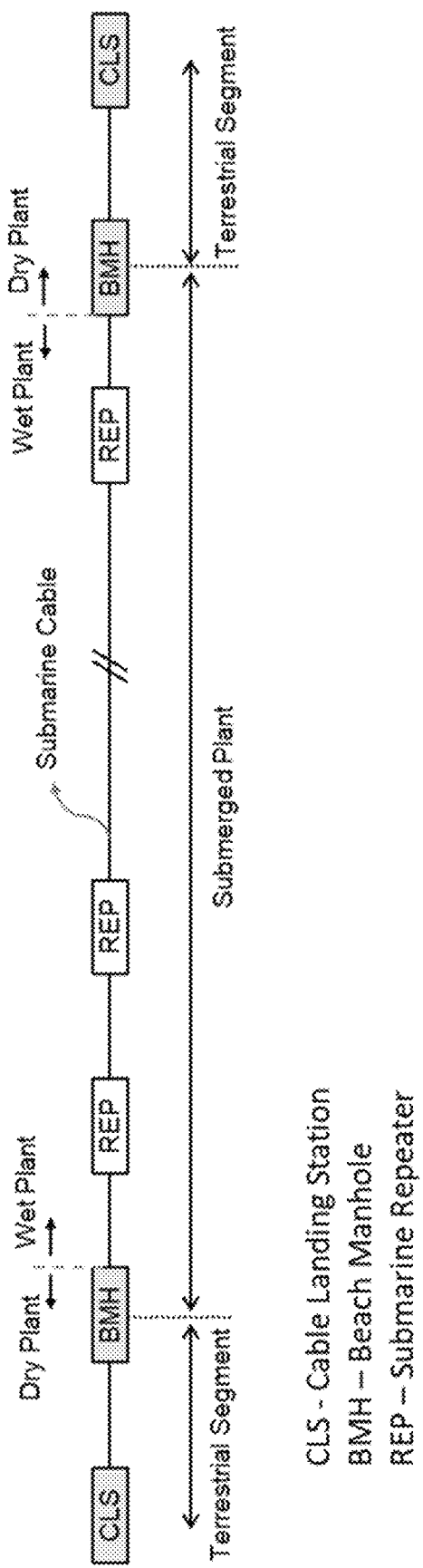
FIG. 1 is a schematic diagram showing an illustrative undersea fiber-optic communications link including components.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.
Introduction to QDK. The BB84 Protocol.

By way of some additional background, we begin with the well-known BB84 protocol for QKD which has been described by C. H. Bennet and G. Brassard in the Proceedings of the International Conference on Computers, Systems & Signal Processing, Bangalore, India, pp. 175-179, December 1984 an republished in Theoretical Computer Science, Volume 560, (Part1), 2014, pp. 7-11, entitled "Quantum cryptography: Public key distribution and coin tossing".

The BB84 protocol works by using the properties of quantum mechanics to create a shared secret key between two parties, Alice, and Bob. Alice randomly generates a sequence of bits and encodes each bit as a quantum state of a photon. She then sends the photons to Bob over an insecure channel. Bob also randomly generates a sequence of bits and measures the photons to determine their states.

If Alice and Bob have both chosen the same basis for their measurements, they will be able to perfectly correlate their bits. However, if an eavesdropper (Eve) tries to eavesdrop on the transmission, she will disturb the quantum states of the photons, and Alice and Bob will be less likely to correlate their bits.

After Alice and Bob have exchanged a sufficient number of photons, they can use a classical channel to communicate and agree on which bits they believe they have correlated correctly. These bits can then be used to create a secret key.

The 8B84 protocol has been experimentally demonstrated over a variety of distances, and it is one of the most secure QKD protocols available.

According to the BB84 protocol, information bits are encoded, for example, in the polarization state of a single photon and the binary values, 1 or 0, are assigned to different orthogonal polarization states. For example, if vertical polarization ($\theta=0$) is a binary 1, then horizontal polarization ($\theta=\pi/2$) will be a binary 0. Alternatively, a different base may be employed and, for example, if $\theta=\pi/4$ polarization angle is a binary 1, then $\theta=3\pi/4$ will be a binary 0.

In a more general way, we can represent the above mentioned 4 quantum states, in Dirac notation, as follows:

$$X \text{ base: } |L_i\rangle = |1_1\rangle + |1_2\rangle, |L_{ii}\rangle = |1_1\rangle - |1_2\rangle$$

$$Y \text{ base: } |L_{iii}\rangle = |1_1\rangle + i|1_2\rangle, |L_{iv}\rangle = |1_1\rangle + i|1_2\rangle.$$

These 4 states, $|L_\sigma\rangle$ with $\sigma=$i, ii, iii, iv, represent single photon states where 1 and 2 indicate two different modes, such as polarization modes, spatial modes or temporal modes that are used to create the quantum state. In case of polarization modes, 1 and 2 represent orthogonal polarizations and the four states can be obtained by relative phases between the modes of 0; $\pi$; $\pi/2$ and $3\pi/2$.

Using Alice, Bob, and Eve as illustrative communicators and eavesdropper respectively, the BB84 protocol works as follows. Alice selects a base, randomly (X for example), and sends a bit encoded in one of the two states, for example $|L_i\rangle$. At a receiver, Bob also selects randomly a base to decompose the quantum state and uses a pair of detectors to capture the single photon. If the bases coincide, transmitted data and received data coincide. If the bases are different, 50% of the data will be correct, on average.

Alice and Bob will exchange some information via public channels, as follows:

Bob and Alice will select some data slots for testing the channel. These time-slots will not be used for secure key exchange. They are just to verify the presence or absence of an eavesdropper.

Bob will communicate the base that he has used in the test time-slots.

Alice will communicate to Bob which time-slots have coincident bases.

Bob will communicate to Alice the results in the coincident bases.

Alice will check the error rate between the transmitted and received bits in the test time-slots. If the channel has not been compromised, the error rate should be zero or very small.

Let us assume than Eve, with unlimited resources, attempts to capture the cryptographic key. Eve can employ identical hardware as Alice and Bob to capture and resend the bits (quantum states). In this simple example explained above, Eve must detect the polarization of the transmitted photons and resend them to Bob. In the classical world, Eve can replicate exactly the incoming data and Bob would not notice if the signal originated from Alice or from Eve. In the quantum world, Eve cannot "clone" the incoming data. To measure the polarization of the transmitted photons, Eve must select a Base.

Since Bob is expecting to detect a photon periodically, Eve must capture the photons sent by Alice and retransmit them to Bob. In the "classical world", Eve will just measure the polarization state of the photons and re-transmit them with identical polarization. Bob would not notice that Eve has captured the key. However, in the "quantum world", the invasive nature of Eve's measurement prevents her to create a copy of Alice's quantum states. Therefore, Eve has no other choice than setting the base randomly to detect Alice's bits. When this happens, Bob and Alice will see an increase of the error rate and they will have statistical proof that Eve has been intercepting their bits.

The BB48 protocol can be better understood with the following example:

Alice sends N bits with random bases. Bob receives the bits with random basis. Alice and Bob share information of which bits have been measured with coincident bases. On average, 50% of the bits will be discarded. Out of the bits with coincident basis, a subset will be used to verity the error rate (for example, 50% of the bits with coincident bases). Once Alice verifies that the bits coincide, they can use the remaining 50% of the correct bits as the secret key.

If Eve captures and resends the bits, on a random basis, Alice will notice that some of the check-bits sent by Bob do not coincide with the bits sent. Statistically, Alice will observe that no less than 25% of the bits will be incorrect. i.e., 50% of the time Eve will use the same Base as Alice, so these bits will be correct. The remaining 50% of the time, since the base is incorrect, Bob will detect a correct bit. However, it is not physically possible for Eve to reduce the error rate below 25% so long as Bob and Alice share a sufficiently large number of random check-bits.

This change in the statistics of the test bits is sufficient for Alice and Bob to detect the presence of Eve and refrain from using the channel for key exchange.

A Hybrid Quantum Key Distribution Protocol for Secure Communications in Undersea Networks As we shall show and describe, our inventive disclosure creates a new protocol, Hybrid HBB84 (HBB84), that enables secure communications between A and B where the fiber-optic communications segment A'-B' is an undersea installation where hardware and optical signals are not generally accessible.

FIG. 1 is a schematic diagram showing an illustrative undersea fiber-optic communications link including components. On a point-to-point system, the submerged equipment includes undersea (submarine) cable and undersea repeaters. The undersea cable includes an electrical conductor (a copper or aluminum layer) and optical fibers for data transmission. The undersea repeaters include optical amplifiers that are powered by electrical current that is provided by the undersea cable electrical conductor.

Unlike terrestrial networks, where an eavesdropper can easily access many ports of entry to the fiber channels (monitoring couplers, or simply access the fiber and splice a coupler with low losses), undersea networks are naturally protected as all the components are sealed to avoid water ingress. In addition, the undersea system is energized from the terrestrial ends. Therefore, any access to the optical fibers or optical amplifiers—or other components—requires the shutdown of the entire network, revealing instantly, a potential threat.

Figure 2:
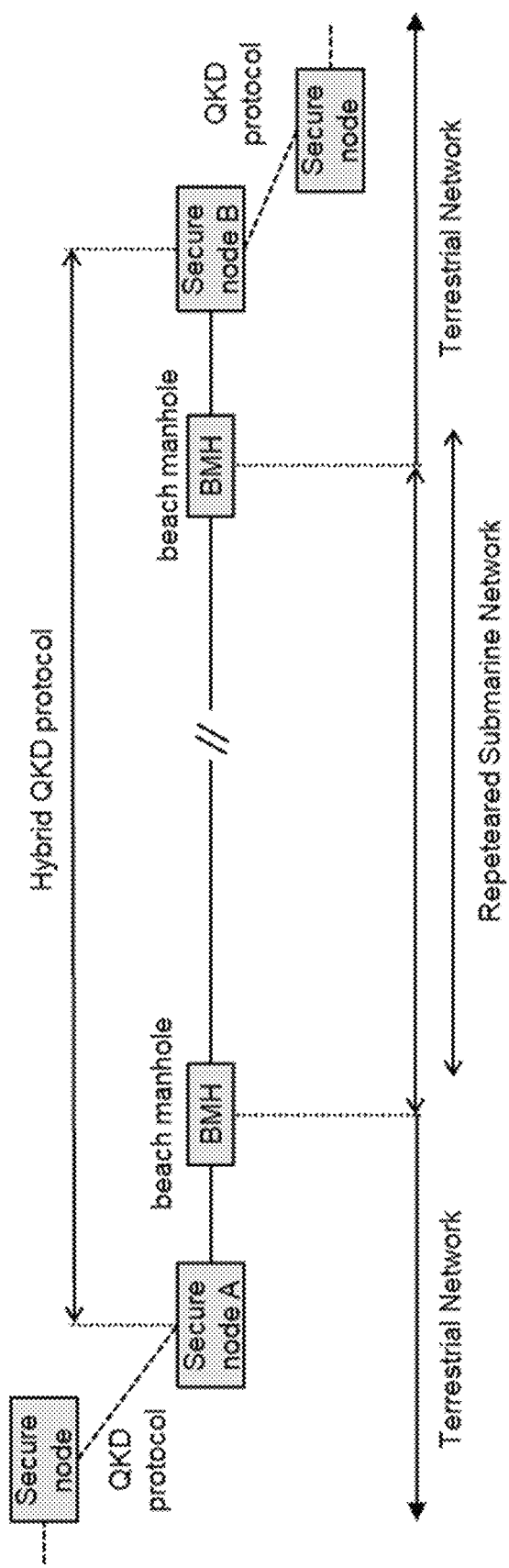
FIG. 2. is a schematic diagram showing an illustrative secure undersea fiber-optic communications link according to aspects of the present disclosure.

FIG. 2. is a schematic diagram showing an illustrative secure undersea fiber-optic communications link according to aspects of the present disclosure. With reference to this figure, we assume that the Secure node A (Alice) and the Secure node B (Bob) are within amplifier-less distance from their respective beach manholes. Our inventive systems and methods employ a hybrid QKD protocol between Alice and Bob where the amplified section is an undersea link—without limitations of distance or number of repeaters.

Hybrid QKD Protocol

Figure 3:
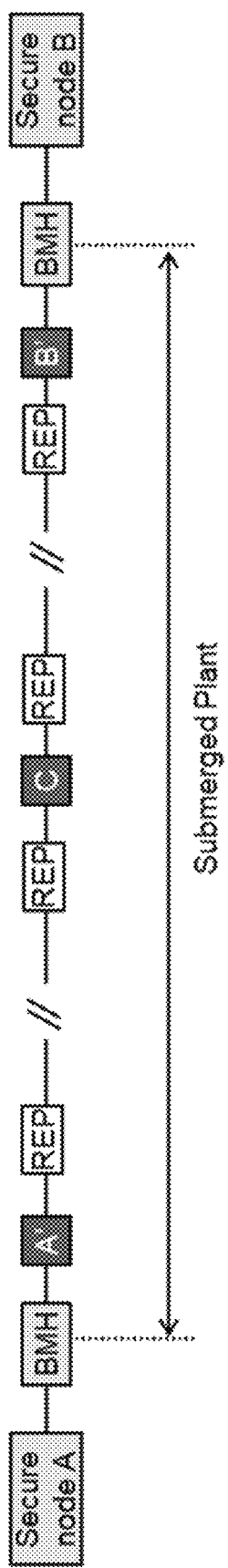
FIG. 3 is a schematic diagram showing an illustrative secure undersea fiber-optic communications link including three locations, A', C, and B', according to aspects of the present disclosure.

To describe our hybrid QKD protocol according to the present disclosure, we consider 3 locations (A', C and B') as illustratively shown in FIG. 3—which is a schematic diagram showing an illustrative secure undersea fiber-optic communications link including three locations, A', C, and B', according to aspects of the present disclosure. As may be observed in this figure, locations A' and B' are allocated between the Beach Manhole (BMH) and the last repeater (called shore-end repeater). Location C is shown located substantially in the middle of the undersea, submarine link.

At location C, a device emits an optical signal with four levels $S_k$, with k=i,ii,iii,iv. This classical signal could be an analog signal or a digital signal, but it transmits five different values (for example, five intensity levels or five polarization levels or five phase levels) distributed randomly in time. The random distribution of these levels is obtained by a quantum state generator (QSG).

The signal S arrives to A' and B' and it is converted to an electric signal. This signal will drive a quantum state generator QSG device. Depending on the value of the classical signal, the QSG will emit a quantum state $|L_k\rangle$. This quantum state is transmitted to Alice and Bob where it will be measured.

After measurement, certain information is shared via a Public channel (for example the same undersea, submarine cable system) to establish a QKD protocol that ensures the absence of an eavesdropper in the unprotected segments A'A and B'B. For simplicity, we assume quantum states are the state of polarization of single photons. This is, for explanatory purposes, the simplest configuration of a QKD protocol.

The four quantum states can be expressed as follows:

$$X \text{ base}: I_i \rightarrow |L_i\rangle = |1_1\rangle + |1_2\rangle; I_{ii} \rightarrow |L_{ii}\rangle = |1_1\rangle - |1_2\rangle$$

$$Y \text{ base}: I_{iii} \rightarrow |L_{iii}\rangle = |1_1\rangle + i|1_2\rangle; I_{vi} \rightarrow |L_{iv}\rangle = |1_1\rangle - i|1_2\rangle).$$

These four states represent the orthogonal states of polarization of the X and Y basis.

Figure 4:
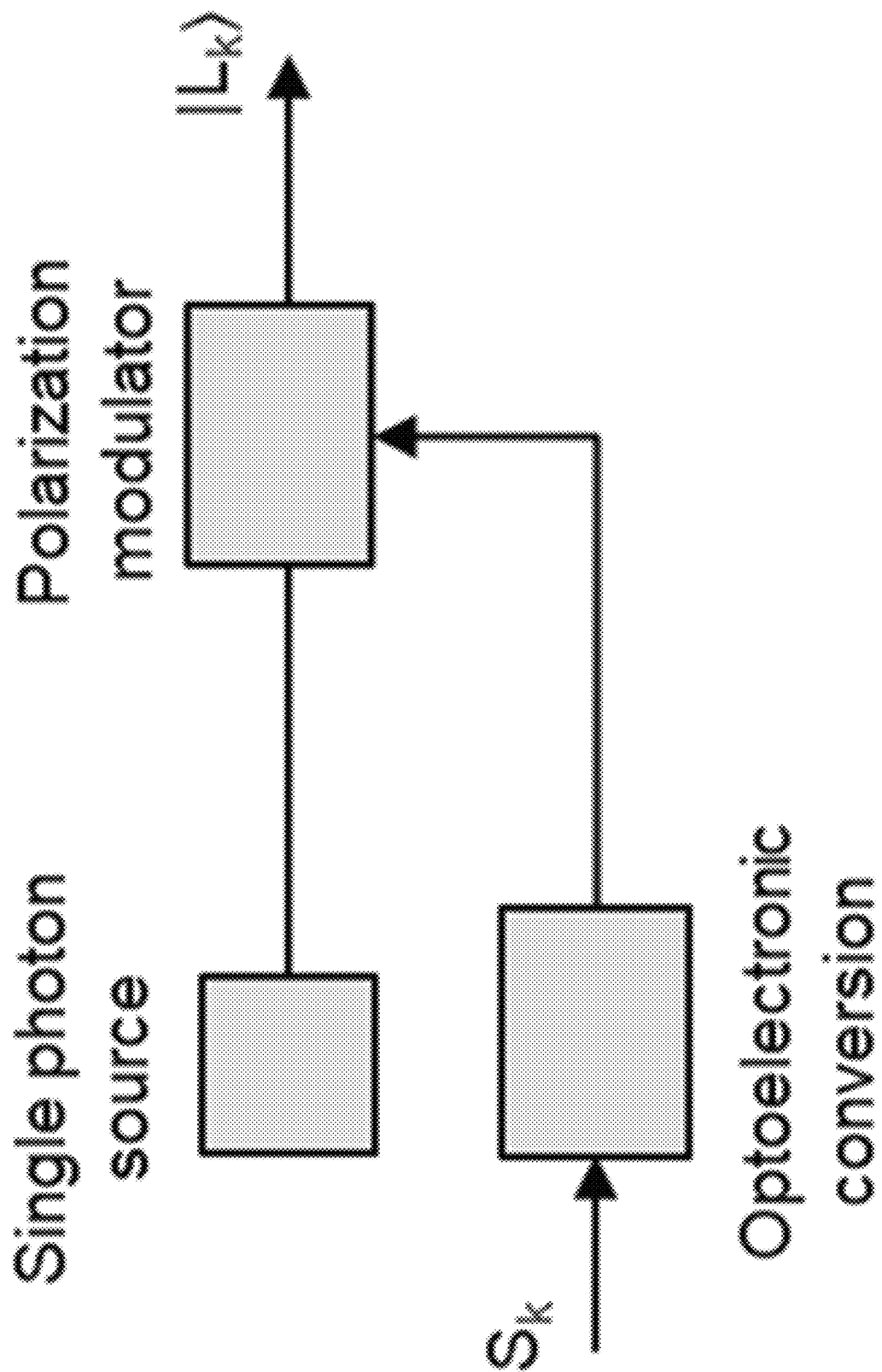
FIG. 4 is a schematic diagram showing an illustrative quantum state generator (QSD) according to aspects of the present disclosure.

FIG. 4 is a schematic diagram showing an illustrative quantum state generator (QSD) according to aspects of the present disclosure. As illustrated therein, signal S k is received and converted to an electrical signal that drives a polarization modulator. This polarization modulation creates the quantum states that are transmitted to Alice and Bob (A and B).

Figure 5:
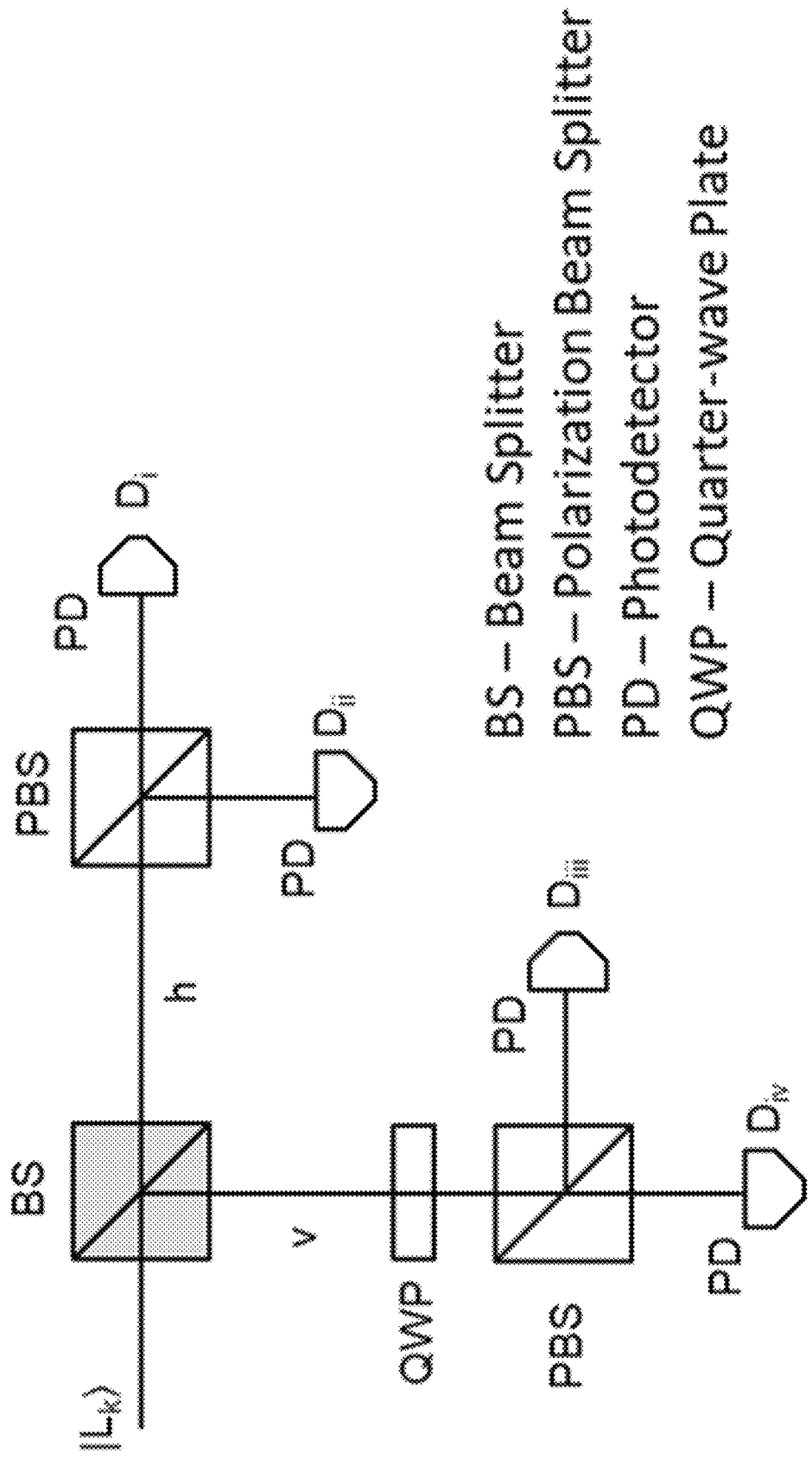
FIG. 5 is a schematic diagram showing illustrative projective measurements performed in end locations A and B of FIG. 1, according to aspects of the present disclosure.

Alice and Bob will use a projective measurement to detect the bits. This measurement is conducted by a device sketched in FIG. 5, which is a schematic diagram showing illustrative projective measurements performed in end locations A and B of FIG. 1, according to aspects of the present disclosure.

The state excited in the path horizontal h is measured in the X basis, that is, a PBS rotated π/4 allows measuring the state $|L_i\rangle$ in the detector $D_i$ and the state the state $|L_{ii}\rangle$ in the detector $D_{ii}$. If the state is excited in path vertical v then the state is measured in the Y basis, that is, a QWP followed by PBS rotated π/4 allows to measure the state $|L_{iii}\rangle$ in the detector $D_{iii}$ and the state $|L_{iv}\rangle$ in the detector D.

The hybrid protocol, while similar to the BB84 protocol explained above, advantageously includes an additional system in C. As a result, the coincidence of bases among Alice (A), Bob (B) and the submerged additional location C is achieved in 25% of the time. As a result, a hybrid approach requiring protocol steps different from BB84 is required.

As we previously noted, for simplicity we assume single-photon states in a two-dimensional space (for example, polarization modes). However, other quantum states can be used to secure A'A and B'B segments.

Our inventive hybrid protocol steps are as follows:

C emits four signals in a random way corresponding to the four quantum states, that is, two basis X and Y. The quantum states are generated in A' and B'.

Alice (at location A) and Bob (at location B) measure the quantum states by using in a random way the two bases X and Y.

C communicates to Alice and Bob through a public channel the base to which belongs each sent signal.

Bob communicates to Alice the events where the bases used to measure the quantum state are the ones of C.

Alice communicates a set (W) of coincidences of bases (number of the events) with Bob.

Bob sends Alice a subset of bits associated to a subset of W to check the error statistics and detect the presence of Eve in any of the A'A or B'B segments.

Alice checks this subset of bits. Then, by considering only an intercept-resend attack, if the error is less than 25% then the key can be used. Otherwise, the key is not used due to the presence of an intercept-resend eavesdropper.

At this point, while we have presented this disclosure using some specific examples, those skilled in the art will recognize that our teachings are not so limited. Accordingly, this disclosure should only be limited by the scope of the claims attached hereto.

The invention claimed is:

1. A hybrid quantum cryptography protocol method for secure communications between Secure Node A (SN-A) and Secure Node B (SN-B) over a fiber optic communications network, the method comprising:
    emitting, by an intermediate node (IN) into a point of the fiber optic communications network in-between SN-A and SN-B, optical signals with four levels exhibiting five different values distributed randomly in time;
    generating, by a pair of quantum state generators, QSG-A, and QSG-B in response to receiving the optical signals with four levels, a respective quantum state QS-A, and QS-B,
    conveying the generated quantum states QS-A, and QS-B, to SN-A, and SN-B respectively; and
    measuring, by SN-A and SN-B, the respective quantum states QS-A, and QS-B conveyed; and
    establishing, using the measured quantum states, a quantum key distribution (QKD) protocol between SN-A and SN-B.

2. The method of claim 1 further comprising:
    converting, by the quantum state generators, the emitted optical signal to an electrical signal.

3. The method of claim 2 further comprising:
    sharing, in response to measuring the respective states, some information between SN-A and SN-B via a public channel.

4. The method of claim 3 wherein the intermediate node and quantum state generators are located undersea.

5. The method of claim 4 wherein the generated optical signals having four levels conveys five different values.

6. The method of claim 5 wherein the respective quantum states QS-A and QS-B are generated by operation of polarization modulators.

7. The method of claim 1 wherein the five different values are selected from the group consisting of intensity level, polarization level, and phase level.

* * * * *